United States Patent [19]

Jackson et al.

[11] Patent Number: 4,727,500

[45] Date of Patent: Feb. 23, 1988

[54] ELECTRONIC THERMOMETER WITH FIXED RESPONSE TIME

[75] Inventors: Edward W. Jackson, Northford, Conn.; Laurie J. Burger, Attleboro Falls, Mass.

[73] Assignee: Sherwood Medical Company, St. Louis, Mo.

[21] Appl. No.: 729,046

[22] Filed: May 1, 1985

[51] Int. Cl.⁴ .................. G01K 3/00; G06F 15/42
[52] U.S. Cl. .................... 364/557; 128/736; 364/415; 364/577; 374/102
[58] Field of Search .............. 364/415, 557, 577; 374/102, 169, 170; 128/736

[56] References Cited

U.S. PATENT DOCUMENTS

| | | | |
|---|---|---|---|
| 3,978,325 | 8/1975 | Goldstein et al. | 364/415 |
| 4,121,574 | 10/1978 | Lester | 128/736 |
| 4,270,547 | 6/1981 | Steffen et al. | 364/415 |
| 4,428,685 | 1/1984 | Lemelson et al. | 128/736 |
| 4,574,359 | 3/1986 | Ishizaka et al. | 364/557 |
| 4,592,000 | 5/1986 | Ishizaka et al. | 374/102 |
| 4,629,336 | 12/1986 | Ishizaka | 128/736 |

FOREIGN PATENT DOCUMENTS 0209125 10/1985 Japan ..................... 364/557

*Primary Examiner*—Errol A. Krass
*Assistant Examiner*—Kevin J. Teska
*Attorney, Agent, or Firm*—Brumbaugh, Graves, Donohue & Raymond

[57] ABSTRACT

An electronic thermometer includes a temperature sensitive element and a programmable microcomputer coupled to receive temperature data from the element. After processing the data in accordance with a control program, a predicted temperature is provided on a display. The program includes instructions causing a microcomputer to store temperature data at selected intervals during a fixed duration sampling period. A computation algorithm is then selected from a high ambient temperature algorithm, a normal ambient temperature algorithm, and a low ambient temperature algorithm, and the body temperature computed using one of the selected algorithms. The thermometer also displays operator error if the temperature sensing element senses a decrease in temperature during the fixed duration sampling period.

11 Claims, 13 Drawing Figures

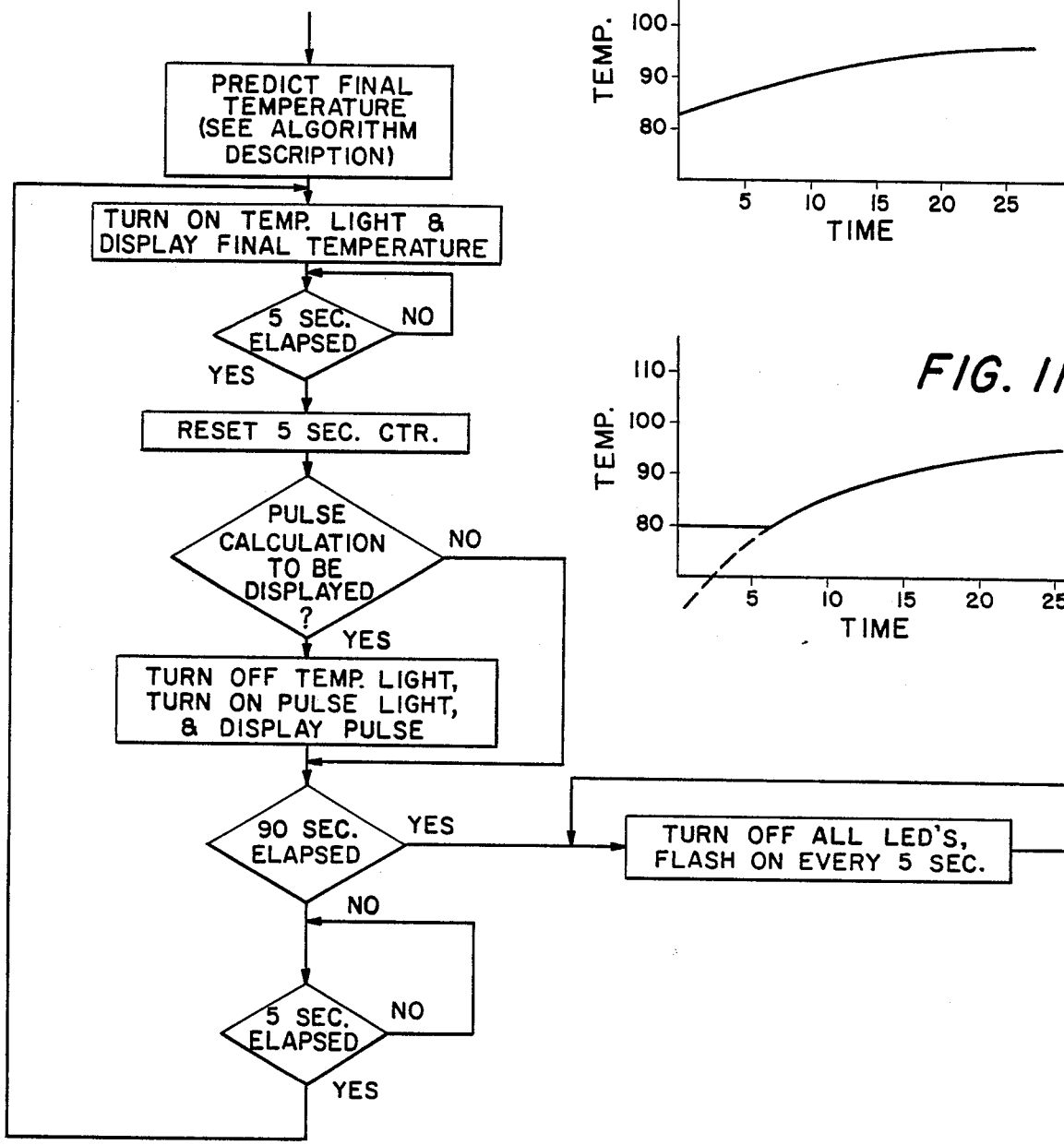
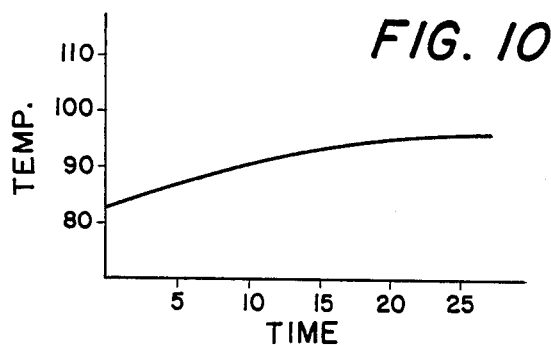
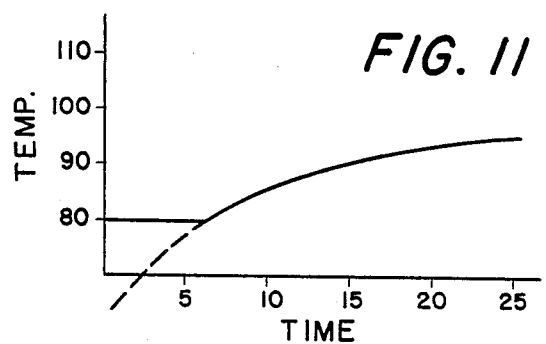
FIG. 3B
FIG. 10
FIG. 11

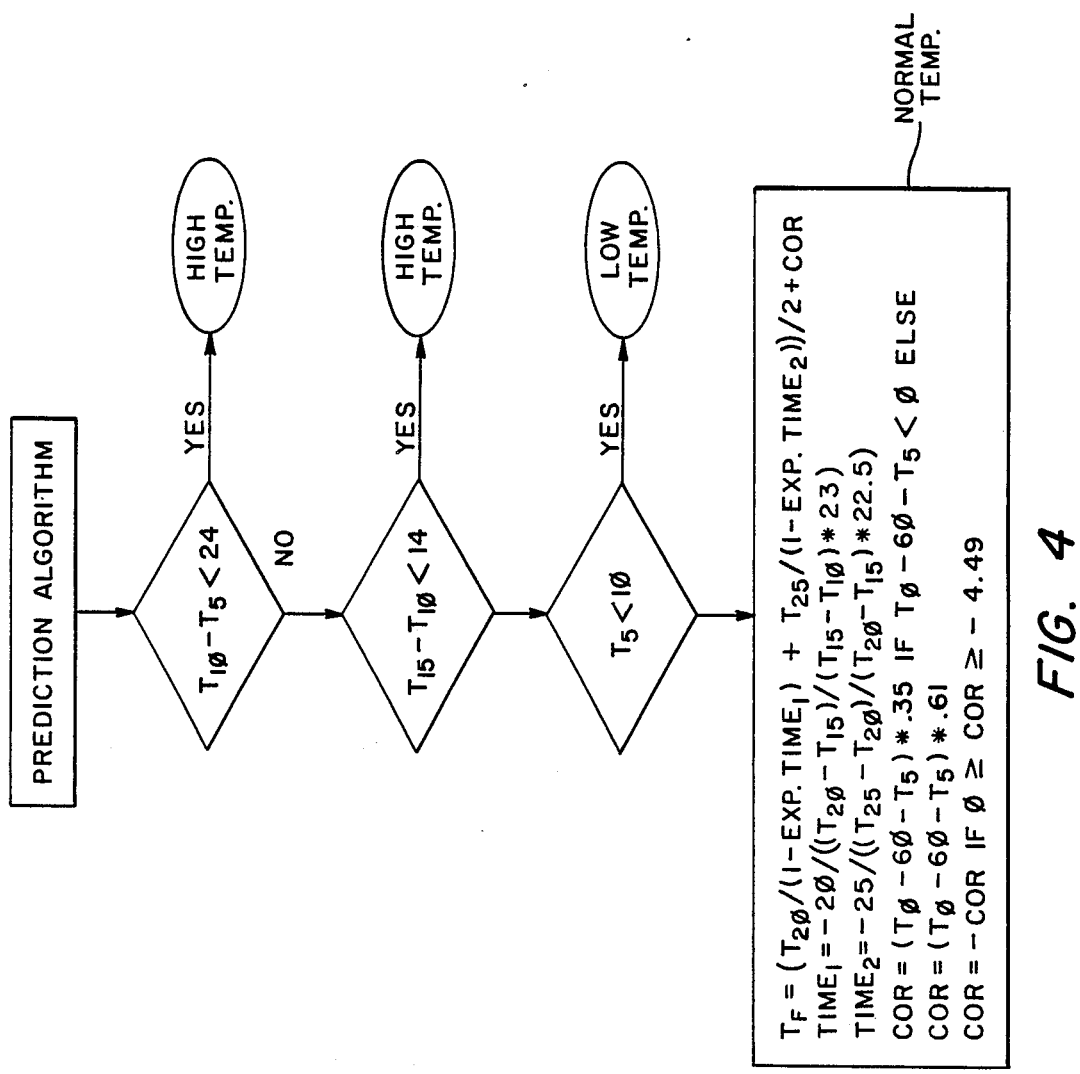

ELECTRONIC THERMOMETER WITH FIXED RESPONSE TIME

A microfiche appendix of 1 microfiche with 40 frames is located in the patented file.

BACKGROUND OF THE INVENTION

For many years thermometers for accurately determining body temperature used mercury in a glass capillary tube. The time required for mercury thermometers to achieve body temperature, when inserted into a body orifice, was on the order of four minutes, an unduly extended period.

In recent years electronic thermometers, which provide rapid and accurate readings of body temperature, have supplanted mercury thermometers in hospitals and the like. Such electronic thermometers ordinarily use a probe at the end of which is located a temperature sensitive element, for example a thermistor. Ordinarily, the electronic thermometers provide a temperature readout in 25 to 40 seconds, depending on several variables. The thermometer includes circuits which compute a predicted final temperature, of the temperature sensitive element based on the the rate of temperature rise. The computation is made when the rate of temperature rise falls below a particular value. As a consequence, the elapsed time for a temperature prediction varies, providing some inconvenience in use.

SUMMARY OF THE INVENTION

The present invention provides an electronic thermometer which accurately predicts body temperature in a fixed time period.

More particularly, the inventive thermometer includes programmed circuits which, after sensing an increase of temperature at the probe tip, selects one of three temperature prediction algorithms, depending upon whether the ambient temperature from which the measurement is initiated is normal, high, or low. The particular algorithm is selected by having the unit sample the temperature at predetermined sampling times after use is initiated. If the probe temperature at particular sampling times is rising at a relatively slow rate, the high temperature algorithm is selected. If the probe temperature at particular sampling times is less than a particular magnitude, then the low temperature algorithm is selected. If neither of these conditions are met, the normal algorithm is used.

Although data is stored at time zero and each five seconds thereafter, data from the probe is sampled each second. If the probe data shows a selected decrease in value over a one second time interval, for example, a drop of 0.1° F. or 0.2° F. in one second, the instrument determines that an operator error has occurred, i.e., contact loss between the tip of the probe and the body, and the unit flashes operator error and restarts.

To facilitate use of the thermometer, a ready light indicates that the instrument is ready for use. When the probe carrying the thermistor is placed in the patient, the ready indicator flashes but then is turned off as the temperature of the temperature sensing element rises above 86° F. The final temperature predicted by the selected algorithm is indicated when the temperature indicator flashes on.

These and further features and advantages of the invention will be more readily understood when the following description is read in connection with the accompanying drawings.

BRIEF DESCRIPTION OF THE DRAWINGS

FIG. 2, comprising

FIGS. 3A, 3B and 4 to 9 are flow charts of the functions performed in the circuits of FIG. 2; and FIGS. 10 and 11 are graphs illustrating the temperature-time curves used in selecting an algorithm for predicting final temperature.

DESCRIPTION OF EXEMPLARY EMBODIMENT

Figure 1:
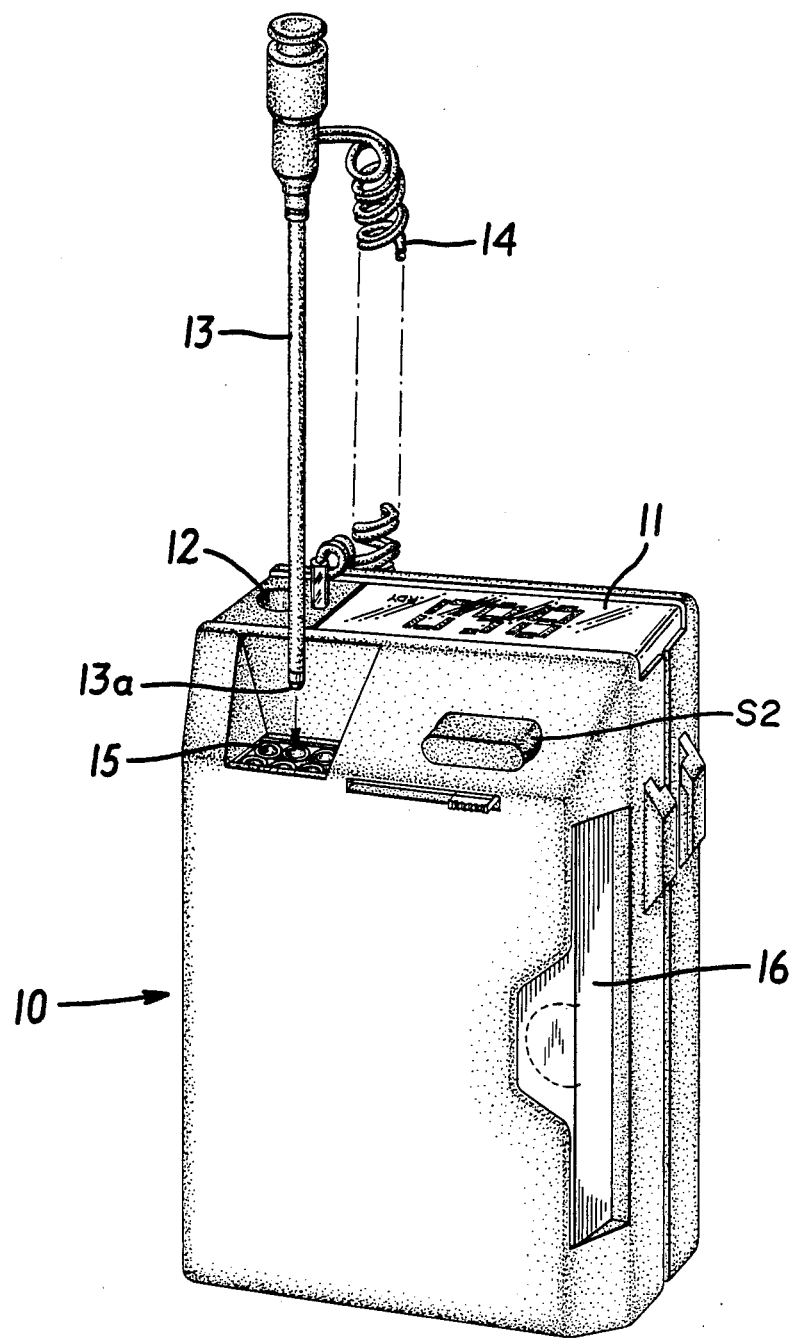
FIG. 1 is a view in perspective of an electronic thermometer in accordance with the present invention.

Referring to the drawings with particular reference to FIG. 1, a housing 10 containing the electronic thermometer is provided at its upper end with a display panel 11 to read out body temperature. An isolation chamber 12 at one side of the housing receives and stores a probe 13 connected to the chamber by a cable 14. When the probe 13 is withdrawn from the isolation chamber 12, its tip is inserted into one of the probe covers 15 carried in a box 16 positioned in a chamber in the housing 10. Further details of the probe and cover dispensing arrangement are provided in U.S. Pat. No. 4,572,365, covering a "Probe Cover Holding and Dispensing Arrangement for Electronic Thermometer", assigned to the assignee of this application.

When the probe 13 is withdrawn from the isolation chamber 12, it operates a switch to provide power to circuits in the electronic thermometer. The location of the microswitch and structure for actuating it are set forth in U.S. Pat. No. 4,619,271 for "Electronic Thermometer with Probe Isolation Chamber," assigned to the assignee of this application.

Figure 2A:
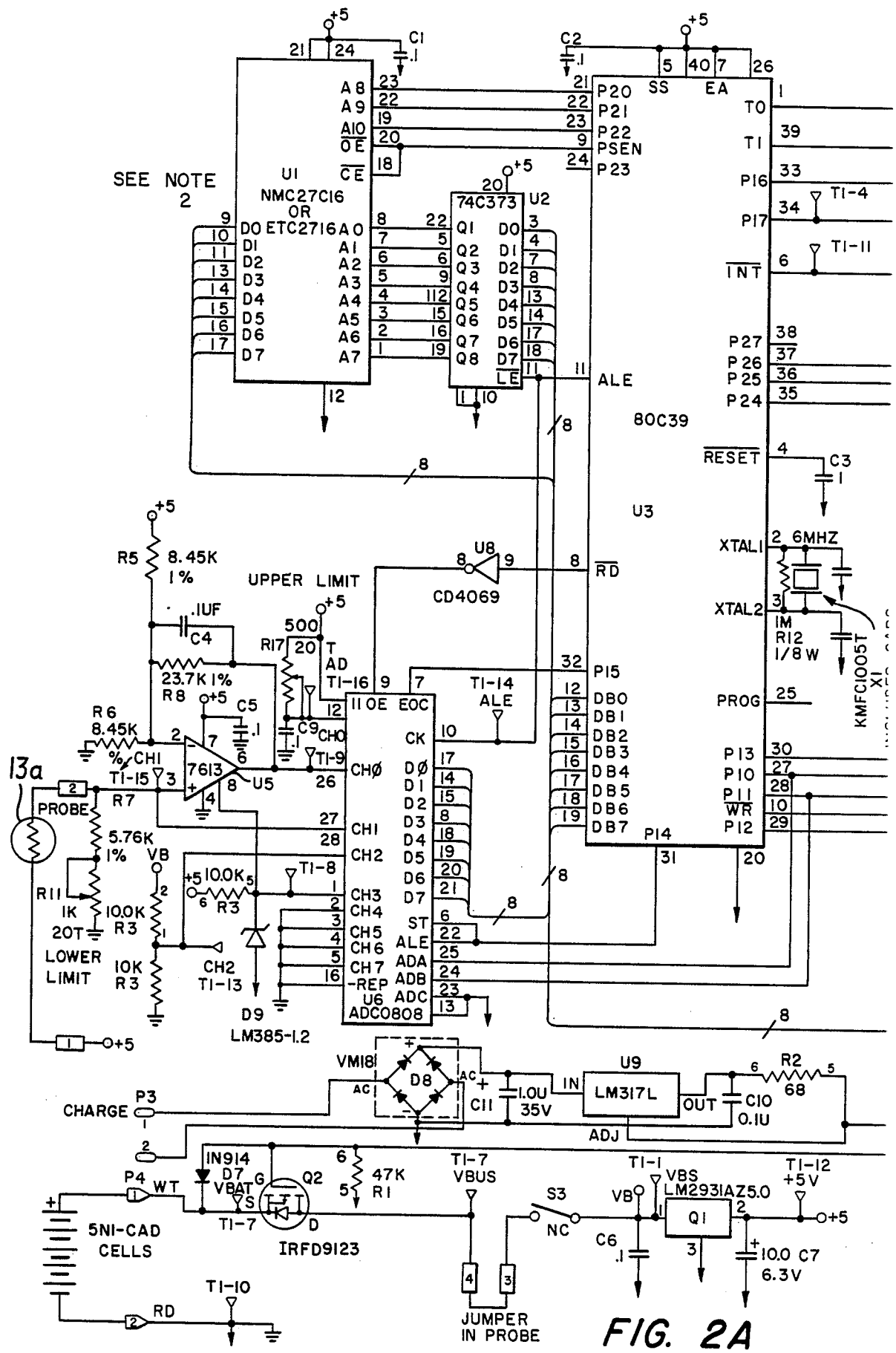
FIGS. 2A and 2B, is a circuit diagram of programmable circuits of the inventive electronic thermometer.
Figure 2B:
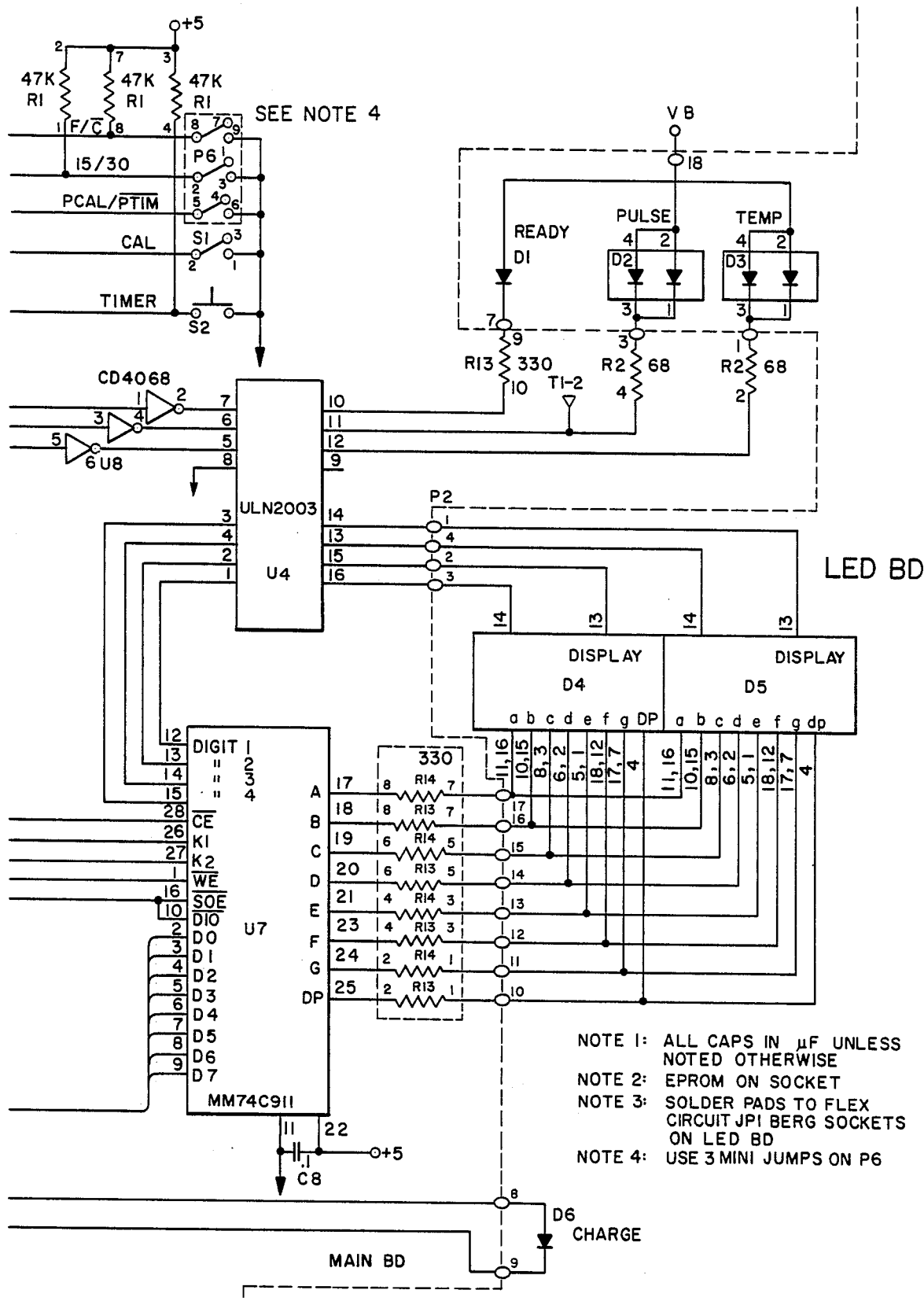
Figure 3A:
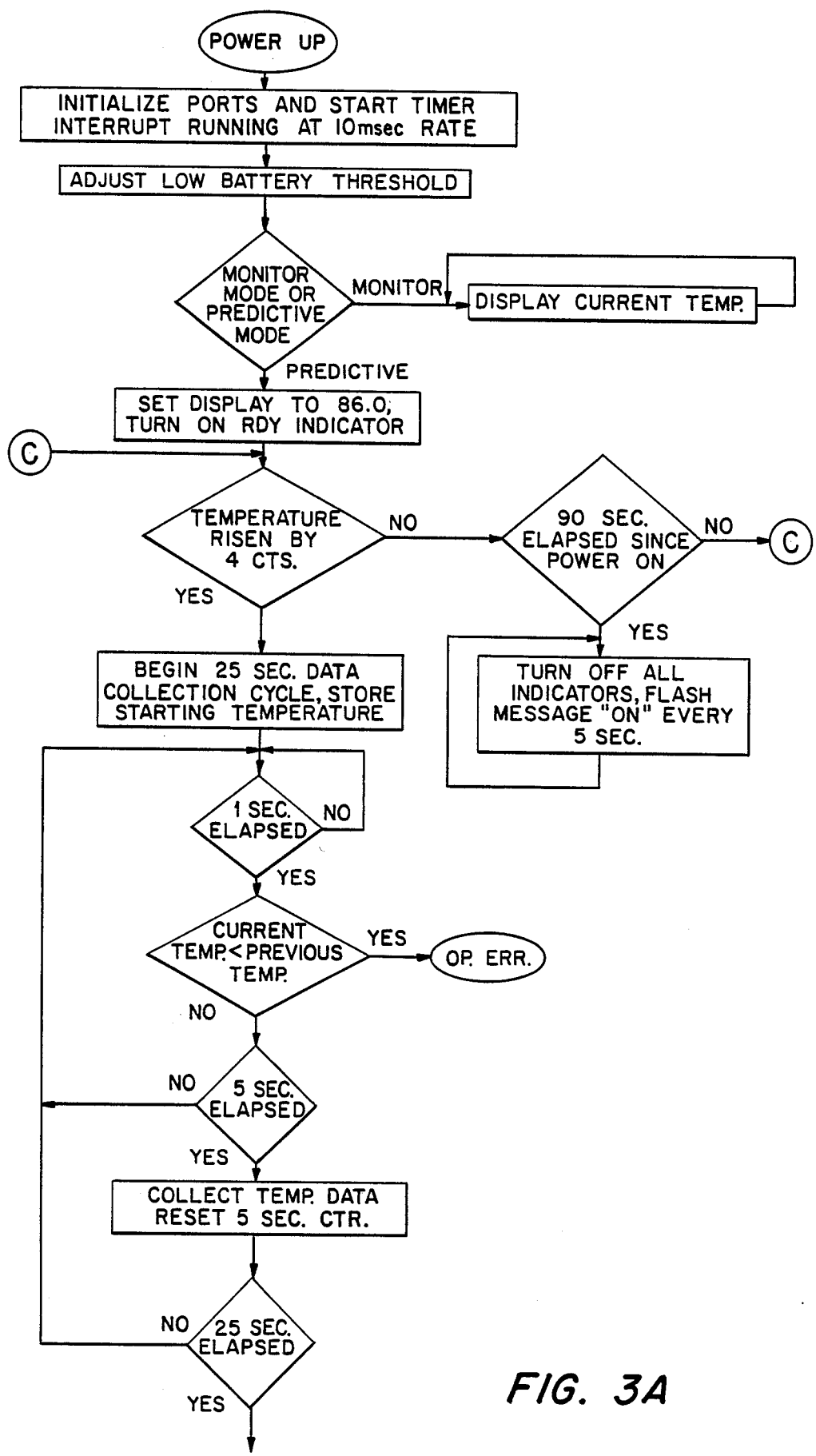

Referring next to the functioning of the electronic thermometer with reference to the flow chart of FIGS. 3A and 3B, withdrawal of the probe 13 from the isolation chamber 12 actuates the microswitch to power the thermometer circuits. As shown in FIG. 2, S3 is the microswitch in the power supply for the thermometer circuits.

When the microswitch S3 is operated, power is supplied to the FIG. 2 circuits starting crystal oscillator X1 and initiating operation of microprocessor U3 under control of the program set forth in the microfiche Appendix hereto, which is stored in read-only-memory U1. The program causes the microprocessor to initialize the ports and start the interrupt timer at a 10 millisecond rate.

Referring again to the FIG. 3A flow chart, a low battery threshold senses whether or not the battery requires charging and, if it does, lights a low battery indicator on the display 11.

The circuits are then in monitor mode or predictive mode, according to the position of switch S1. If the former, the display 11 displays data representing the current temperature of the thermistor 13a at the tip of probe 13. In the event the probe 13 is not subjected to increased temperature within 90 seconds, all display indicators are turned off and the message "ON" is flashed every five seconds on the display. The probe must then be re-inserted into the isolation chamber and withdrawn again to ready the thermometer for operation.

Thermistor 13a at the tip of the probe 13 provides via suitable circuit temperature data in the form of a d-c voltage, determined by the temperature of thermistor 13a, to the input of operational amplifier U5 operating linearly in the range 85° to 110° Fahrenheit (all degree designations are given in degrees Fahrenheit). Temperature data may be displayed in degrees Celsius by operation of internal jumper switch P6. Note that the analog output of the operational amplifier U5 is converted to binary counts by the analog to digital converter U6. All temperatures from $T_0$ (temperature at start) to $T_{25}$ (temperature at 25 seconds) are measured in counts (one count approximately equals 0.1°) corresponding to temperatures from 85° to 110°.

The temperature sensitive element 13a in probe 13 is connected directly to A to D converter U6 through channel CH1 and also to channel CH0 by operational amplifier U5. The direct connection to CH1 is used for a determination of initial temperature rise and also for purposes of obtaining initial temperature data $T_0$. When the circuit then undertakes to gather temperature data for subsequent time intervals, $T_5$, $T_{10}$, $T_{15}$, $T_{20}$ and $T_{25}$, the data available through operational amplifier U5 supplied to channel CH0 on A to D converter U6 is used. For this reason, correction factors in the algorithms hereinafter described include correction for the different analog scale and level for signals supplied via operational amplifier U5. It should be noted that the output of amplifier U5 has a minimum level which corresponds to a temperature of 85°. Accordingly a determination of initial temperature rise from a lower ambient level must be sensed directly from the output of probe 13a by channel CH1 of A to D converter U6.

After the thermometer has been switched on by withdrawing the probe from its holder, the microcomputer samples the digitized probe temperature output, which is derived from the analog signal input at terminal CH1 of A to D converter U6. If the microcomputer does not detect a rise of 4 counts in the output of U6 within a 90 second time period, the LED display is caused to flash "ON" at five second intervals to signal that the probe should be replaced in its chamber. When the output of U6 is detected to have risen by four counts, signalling that the probe has been placed into a patient, the "RD7" message is signalled on the LED display and the unit commences a 25 second data collection and temperature prediction cycle wherein probe temperature data at the output of operational amplifier U5 is sampled at one second intervals and stored as data at five second intervals. It should be noted that the output of A-to-D converter U6 during the data collection cycle has values $T_5$, $T_{10}$, $T_{15}$ etc. which correspond to the digitized output of operation amplifier U5 supplied by input CH0 to A-to-D converter U6 while the initial digitized temperature sample $T_0$ is supplied from the probe to input CH1 of A-to-D converter U6. Thus the digital values of $T_0$ have different level and scale than values $T_5$, $T_{10}$, etc.

Figure 8:
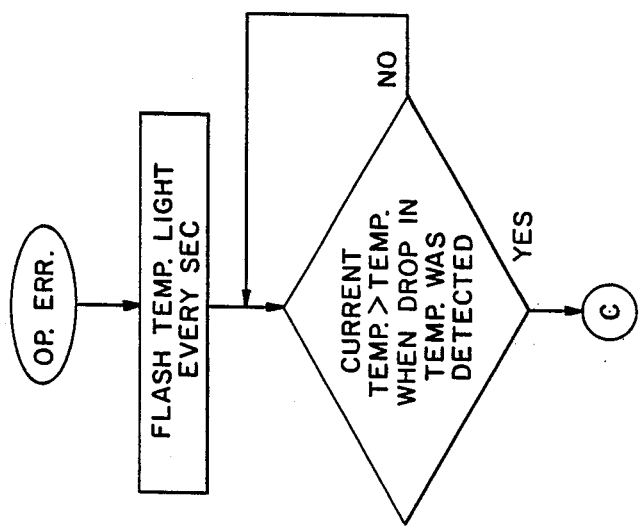

At the end of each one second period, if the current probe temperature data is less than the previous temperature data, i.e., there is a drop of one to two counts in one second, operator error is indicated, meaning that the probe tip has lost contact with the patient. As shown in the FIG. 8 flow chart, the display repeatedly flashes "TEMP" to indicate this condition.

During the 25 second data collection period the circuit checks for a temperature drop every second, but stores temperature data only every 5 seconds. The stored temperature data for the starting time, $T_0$ and subsequent sample times $T_5$, $T_{10}$, $T_{15}$, $T_{20}$ and $T_{25}$ is used to compute a final probe temperature, corresponding to the patient's temperature.

After the elapse of 25 seconds, the final temperature $T_F$ is predicted and displayed through the use of one of the three prediction algorithms shown in FIGS. 4, 5 and 6.

Referring more particularly to the process of selecting one of three temperature prediction algorithms with reference to FIG. 4, when the temperature data at ten seconds $T_{10}$ minus the temperature data at five seconds $T_5$ is less than 24 counts or 2.4°, or the temperature data at fifteen seconds $T_{15}$ minus the temperature data at ten seconds $T_{10}$ is less than 14 counts or 1.4°, the high temperature algorithm is selected. It will be understood that both of these conditions represent a relatively low rate of temperature rise, which is characteristic of a relatively high initial temperature value, as shown in FIG. 10. The higher than normal starting temperature provided by the ambient conditions requires use of an algorithm for predicting final temperature $T_F$, shown in FIG. 5, which reflects the lesser slope of the temperature-time curve.

Again referring to FIG. 4, if the temperature data at five seconds $T_5$ is less than a count of 10, corresponding to less than about 85.5°, the output of the operational amplifier U5 (FIG. 2), shown in FIG. 11, includes a flat curve portion wherein the output is at its lower limit representing 85° during the initial sampling period.

This lower limit corresponds to the minimum output voltage of operational amplifier U5, which is set to about 100 mV., corresponding to a minimum digital count of 5 and temperature at or below 85°. Accordingly, a count of 10 at the $T_5$ sample corresponds to a temperature of about 85.5°. A broken line curve shows actual probe temperature. The upward slope of the amplifier output occurs when the probe temperature exceeds the 85° level. Thus, with the ambient temperature lower than normal, the initial portion of the temperature-time curve slope will be steeper than normal. Also with this condition, at $T_5$ there will be less than a ten count digital increase above the flat output of the operational amplifier; note the curve at $T_5$ in FIG. 11. As a result, a low temperature algorithm, shown in FIG. 6, is selected which takes into account, in predicting the final temperature, $T_F$, the steeper slope of the temperature-time curve.

Finally, if neither of the high nor low temperature algorithm is selected, then the medium or normal temperature algorithm is selected as shown in FIG. 4.

The normal temperature algorithm for the calculated final temperature $(T_F)$ in FIG. 4 shows use of a prediction of a final temperature using the temperature data at 20 seconds $(T_{20})$ and at 25 seconds $(T_{25})$. The equation uses exponential time (EXP. TIME) in both instances. The two predicted temperatures are averaged, i.e., added and divided by two, and a correction factor COR is added as shown in FIG. 4.

The equation for the high temperature algorithm is:

$T_F = T_{20} * K1 + COR$ $COR = (T_0 - T_5)/K2$ IF $T_0 - T_5$ is less than $K_3$

ELSE COR = 0 where:

$T_F$ = computed temperature
$T_0$ = temperature data initially
$T_5$ = probe temperature data at five seconds
$T_{20}$ = probe temperature data at twenty seconds and
K1, K2 and K3 are constants selected for accurate temperature computation.

The equation for the normal temperature algorithm is:

$$T_F = (T_{20}/(1-\text{EXP. TIME}_1) + T_{25}/(1-\text{EXP. TIME}_2))/2 + COR$$

where:

$$\text{TIME}_1 = -K6/((T_{20}-T_{15})/(T_{15}-T_{10})*K7)$$

$$\text{TIME}_2 = K8/((T_{25}-T_{20})/(T_{20}-T_{15})*K9)$$

$$COR = (T_0 - K10 - T_5)*K11, \text{ IF } (T_0 - K12 - T_5) \text{ is greater than 0}$$

ELSE: $COR = (T_0 - K13 - T_5)*K14,$

AND: $COR = -COR$, IF 0 COR K15

$T_F$ = computed temperature
$T_0$ = probe temperature data initially
$T_5$ = probe temperature data at five seconds
$T_{10}$ = probe temperature data at ten seconds
$T_{15}$ = probe temperature data at fifteen seconds
$T_{20}$ = probe temperature data at twenty seconds
$T_{25}$ = probe temperature data at twenty-five seconds and
K6, K7, K8, K9, K10, K12, K13, K14 and K15 are constants selected for accurate temperature computation.

The equation for the low temperature algorithm is:

$$T_F = (T_{25}*K4) - (T_{10}-K5)$$

where:
$T_{25}$ = probe temperature data at twenty-five seconds
$T_{10}$ = probe temperature data at ten seconds and
K4 and K5 are constants selected for accurate temperature computation.

An important aspect of the present invention is that, assuming an operator error has not occurred, temperature data collection takes place in a fixed 25 second interval. Prior art electronic thermometers use a variable time interval which provided for temperature prediction using a single algorithm which become operative when the rate of probe temperature rise decreased to a selected value. Accordingly, when the initial probe temperature was at a lower value, the prior art would require a longer time to compute temperature. By using selectable alternate algorithms, the thermometer of the present invention will compute temperature with data taken over a fixed 25 second interval. Actual computation and initial sampling rate times at start can create a very small (less than 1.8 second) additional time period.

Returning to the circuit diagram of FIG. 2 and the flow chart of FIGS. 3A and 3B, the final temperature is displayed when the display driver U7 operates the LED's in the display 11 shown in the circuit diagram on the LED board.

Figure 7:
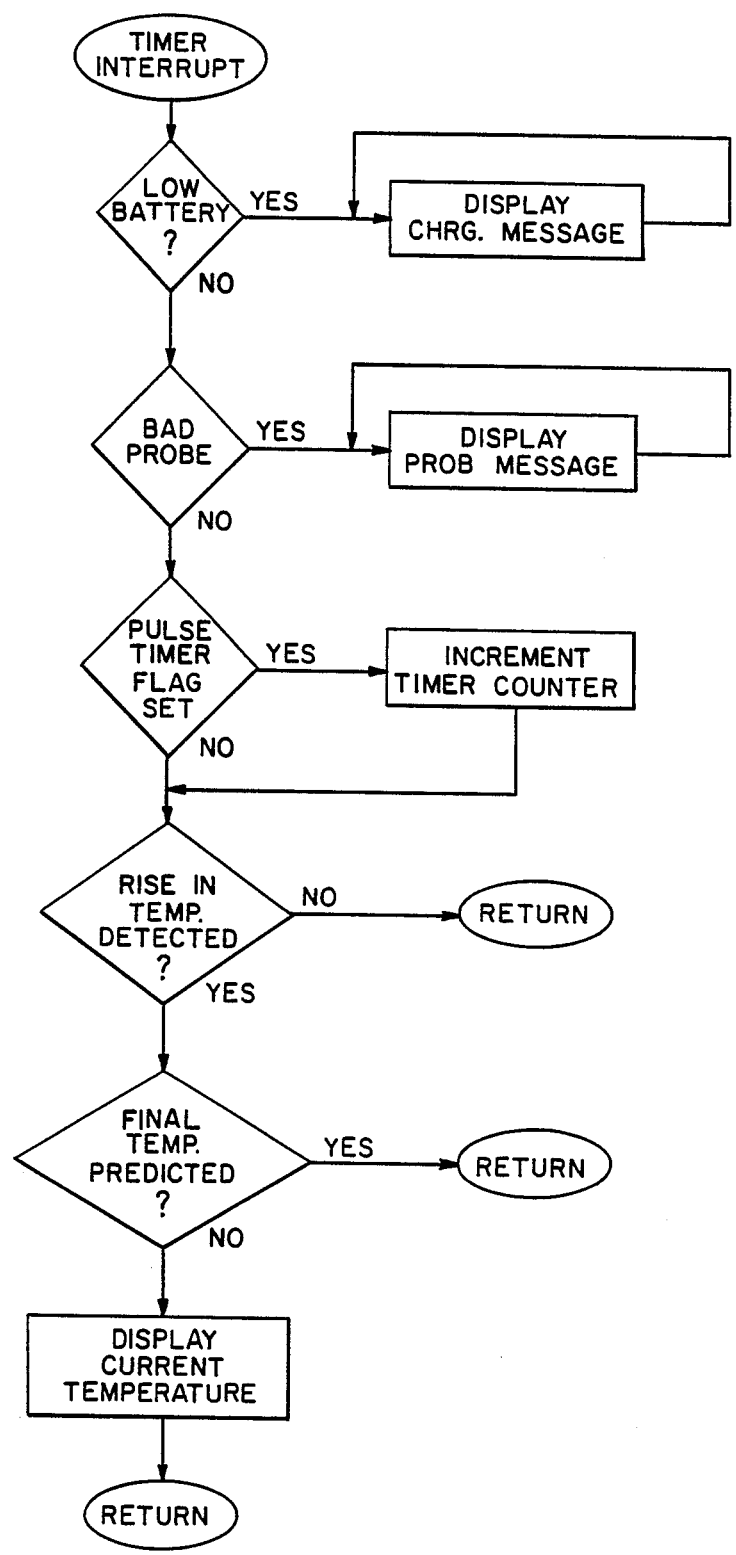

The flow chart of FIG. 7 shows additional functions performed by the programmed thermometer circuits. Initially the circuits determine if there is low battery voltage. If so, the indicator 11 displays "CHRG", and no further steps are performed.

Assuming proper battery voltage, the programmed circuits then check for proper probe response. If a faulty probe is indicated, the display lights the indication "PROBE", and no further steps are performed.

As the program continues, if the pulse timer button is depressed, the increment timer counter will be actuated for providing proper indications of pulse rate.

As the program continues, a rise in temperature must be detected or the programmed circuits return to an earlier stage. Finally a final temperature must be predicted through use of a proper algorithm or only the current temperature is displayed as it increases.

Figure 9:
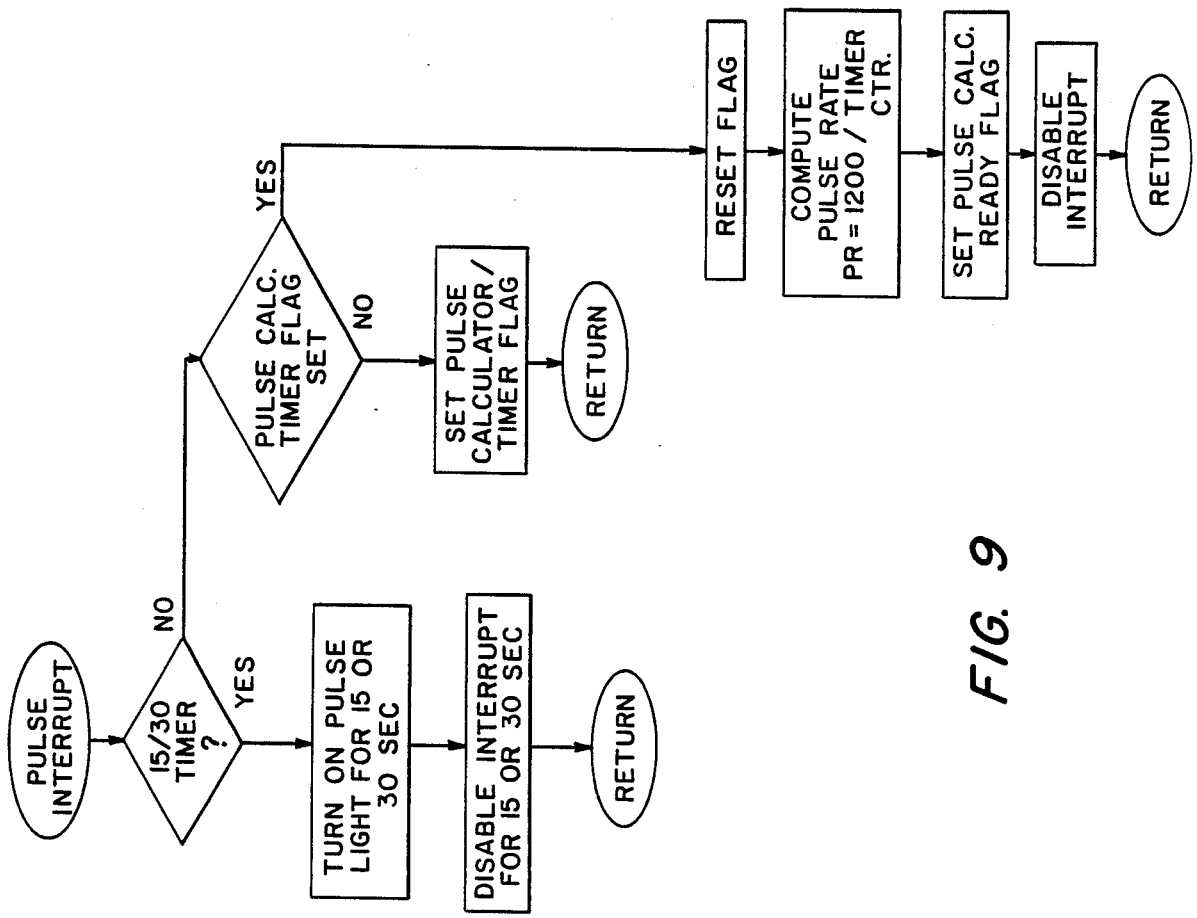

Referring to FIG. 9, when the pulse button S2 has been depressed to actuate the pulse interrupt, one of two programs is activated, according to the condition of jumper wires on P6. First, if a selectable time of fifteen or thirty seconds is to be used to determine pulse in the normal manner, the indicator "PULSE" is lighted for fifteen or thirty seconds and the pulse interrupt is disabled. If the circuits have been programmed for actual pulse calculations, when the button is depressed the time flag is set. When the timer flag is reset after a fixed number of pulse counts, for example twenty pulse beats, the pulse rate is computed and displayed alternately with the temperature on the indicator. The pulse interrupt is then disabled.

The circuits shown in FIG. 2 when programmed pursuant to the exemplary program of the microfiche Appendix are to a large extent self-explanatory. Initially, the programmable read-only memory U1 is programmed with the exemplary program of the attached microfiche Appendix. The functioning of the 8-bit microprocessor U3 provides the functions stated in the flow charts of FIGS. 3A, 3B and 4 to 9 and, more particularly, performs computations in accordance with the algorithms to predict the final temperature.

While there has been described what is believed to be the preferred embodiment of the invention, those skilled in the art will recognize that other and further modifications may be made thereto without departing from the scope of the invention and it is intended to claim all changes and modifications as fall within the spirit of the invention.

We claim:

1. An electronic thermometer, comprising:
a temperature sensing element;
a programmable microcomputer electronically connected to receive temperature data from said sensing element and electronically connected to enable it to provide an output to a display; and
a control program for computing the temperature of a body in thermal contact with said sensing element from said temperature data, said program including instructions which cause said microcomputer to store temperature data at selected time intervals during a fixed duration sampling period, to select a computation algorithm from a high ambient temperature algorithm, a normal ambient temperature algorithm, and a low ambient temperature algorithm according to the values of said stored temperature data, to compute said body temperature using said selected algorithm and said stored temperature data, and to provide an output to said display representing said computed body temperature.

2. An electronic thermometer as defined in claim 1, wherein the program selects the high temperature algorithm when the difference between said temperature data at selected pairs of said time intervals is less than a preselected value.

3. An electronic thermometer as defined in claim 1, wherein the program selects the low temperature algorithm when the temperature data at a selected one of said time intervals is less than a preselected value.

4. An electronic thermometer as defined in claim 1, wherein the program selects the high temperature algorithm when the difference between the temperature data at selected pairs of said time intervals is less than a selected value, the program selects the low temperature algorithm when the temperature data at a selected one of said time intervals is less than a selected value, and the program selects the normal temperature algorithm when neither of the high and low temperature algorithms are selected.

5. An electronic thermometer as defined in claim 1, wherein the high temperature algorithm is:

$$T_F = T_{20} * K1 + COR$$

$$COR = (T_0 - T_5)/K2 \text{ IF } T_0 - T_5 \text{ is less than } K_3$$

$$\text{ELSE COR} = 0$$

where:
$T_F$ = computed temperature;
$T_0$ = probe temperature data initially
$T_5$ = probe temperature data at five seconds
$T_{20}$ = probe temperature data at twenty seconds and K1, K2 and K3 are constants selected for accurate temperature computation; the normal temperature algorithm is:

$$T_F = T_{20}/(1-\text{EXP. TIME}_1) + T_{25}/(1-\text{EXP. TIME}_2))/2 + COR$$

where:

$$\text{TIME}_1 = -K6/((T_{20} - T_{15})/(T_{15} - T_{10}) * K7)$$

$$\text{TIME}_2 = K8/((T_{25} - T_{20})/(T_{20} - T_{15}) * K9)$$

$$COR = (T_0 K10 - T_5) * K11, \text{ IF } (T_0 - K12 - T_5) \text{ } 0$$

$$\text{ELSE: } COR = (T_0 - K13 - T_5) * K14,$$

$$\text{AND: } COR = -COR, \text{ IF } 0 \text{ COR } K15$$

$T_F$ = computed temperature
$T_0$ = probe temperature data initially
$T_5$ = probe temperature data at five seconds
$T_{10}$ = probe temperature data at ten seconds
$T_{15}$ = probe temperature data at fifteen seconds
$T_{20}$ = probe temperature data at twenty seconds
$T_{25}$ = probe temperature data at twenty-five seconds
K6, K7, K8, K9, K10, K12, K13, K14 and K15 are constants selected for accurate temperature computation;
EXP. TIME$_1$ and EXP. TIME$_2$ are exponential times for TIME$_1$ and TIME$_2$ as defined; and the low temperature algorithm is:

$$T_F = (T_{25} * K4) - (T_{10} - K5)$$

where: $T_{25}$ = probe temperature data at twenty-five seconds
$T_{10}$ = probe temperature data at ten seconds and K4 and K5 are constants selected for accurate temperature computation.

6. An electronic thermometer as defined in claim 1, in which is provided means responsive to decreasing values of sampled temperature data over a second selected time interval having a duration less than that of said selected time intervals to supply an error indication to said display.

7. An electronic thermometer as defined in claim 2 or 4, wherein the selected pairs of time intervals are the elapsed time of first and second time periods and the elapsed time of second and third time periods, respectively.

8. An electronic thermometer as defined in claim 3 or 4, wherein the selected one of said time intervals is the elapsed time of a first time period.

9. An electronic thermometer as defined in claim 1, 2 or 4, wherein the high temperature algorithm is $$T_F = T_{20} * K_1 + COR$$

$$COR = (T_0 - T_5)/K_2, \text{ IF } T_0 - T_5 \text{ is less than } K_3$$

$$\text{ELSE COR} = 0$$

where
$T_F$ = computed temperature;
$T_0$ = probe temperature data initially
$T_5$ = probe temperature data at five seconds
$T_{20}$ = probe temperature data at twenty seconds and K1, K2 and K3 are constants selected for accurate temperature computation.

10. An electronic thermometer as defined in claim 1, 3 or 4, wherein the low temperature algorithm is $$T_F = (T_{25} * K4) - (T_{10} - K5)$$

where
$T_{25}$ = probe temperature data at twenty-five seconds
$T_{10}$ = probe temperature data at ten seconds and K4 and K5 are constants selected for accurate temperature computation.

11. An electronic thermometer as defined in claim 1 or 4, wherein the normal temperature algorithm is $$T_F = (T_{20}/(1-\text{EXP. TIME}_1) + T_{25}/(1-\text{EXP. TIME}_2))/2 + COR$$

where:

$$\text{TIME}_1 = -K6/((T_{20} - T_{15})/(T_{15} - T_{10}) * K7)$$

$$\text{TIME}_2 = -K8/((T_{25} - T_{20})/(T_{20} - T_{15}) * K9)$$

$$COR = (T_0 - K10 - T_5) * K11, \text{ IF } (T_0 - K12 - T_5) \text{ is greater than } 0$$

$$\text{ELSE: } COR = (T_0 - K13 - T_5) * K14,$$

$$\text{AND: } COR = -COR, \text{ IF } 0 \text{ COR } K15$$

$T_F$ = computed temperature
$T_0$ = probe temperature data initially
$T_5$ = probe temperature data at five seconds
$T_{10}$ = probe temperature data at ten seconds
$T_{15}$ = probe temperature data at fifteen seconds
$T_{20}$ = probe temperature data at twenty seconds
$T_{25}$ = probe temperature data at twenty-five seconds
K6, K7, K8, K9, K10, K12, K13, K14 and K15 are constants selected for accurate temperature computation, and
EXP. TIME$_1$ and EXP. TIME$_2$ are exponential times for TIME$_1$ and TIME$_2$ as defined.

* * * * *

UNITED STATES PATENT AND TRADEMARK OFFICE
CERTIFICATE OF CORRECTION

PATENT NO. : 4,727,500

DATED : Feb. 23, 1988

INVENTOR(S) : Jackson et al.

It is certified that error appears in the above-identified patent and that said Letters Patent is hereby corrected as shown below:

Col. 4, line 62, that portion of the equation reading "is less than" should read --is greater than--. Col. 5, lines 18-19, that portion of the equation reading "is greater than" should read --is less than--; line 23, that portion of the equation reading "IF 0 COR K15" should read --IF $0 \geq$ COR $\geq$ K15--. Col. 7, line 25, that portion of the equation reading "is less than" should read --is greater than--; line 46, "COR = $(T_0$ K 10$-T_5)$ * K11, IF $(T_0-K12-T_5)$ 0" should read --COR = $(T_0-K10-T_5)$ * K11, IF $(T_0-K12-T_5$ is less than 0--; line 49, that portion of the equation reading "IF 0 COR K15" should read --IF $0 \geq$ COR $\geq$ K15--. Col. 8, line 21, that portion of the equation reading "is less than" should read --is greater than--; lines 51-52, that portion of the equation reading "is greater than" should read --is less than--; line 55, that portion of the equation reading "IF 0 COR K15" should read --IF $0 \geq$ COR $\geq$ K15--.

Signed and Sealed this

Twenty-ninth Day of November, 1988

Attest:

DONALD J. QUIGG

Attesting Officer

Commissioner of Patents and Trademarks